(12) United States Patent
Ayukawa

(10) Patent No.: US 10,259,506 B2
(45) Date of Patent: Apr. 16, 2019

(54) VEHICLE BODY LOWER PORTION STRUCTURE

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/727,321

(22) Filed: Oct. 6, 2017

(65) Prior Publication Data

US 2018/0148106 A1 May 31, 2018

(30) Foreign Application Priority Data

Nov. 30, 2016 (JP) .................. 2016-233125

(51) Int. Cl.
| | |
|---|---|
| B62D 25/20 | (2006.01) |
| B60L 11/18 | (2006.01) |
| B62D 21/15 | (2006.01) |
| B62D 25/02 | (2006.01) |
| B62D 29/00 | (2006.01) |
| B60K 1/04 | (2019.01) |

(52) U.S. Cl.
CPC ............... B62D 25/20 (2013.01); B60K 1/04 (2013.01); B60L 11/1879 (2013.01); B62D 21/157 (2013.01); B62D 25/025 (2013.01); B62D 25/2036 (2013.01); B62D 29/008 (2013.01); B60K 2001/0438 (2013.01); B60Y 2306/01 (2013.01)

(58) Field of Classification Search
CPC .... B62D 21/157; B62D 25/025; B62D 25/20; B62D 21/152; B62D 29/008; B60L 11/1817; B60K 1/04

USPC ............................................ 296/187.12, 209
See application file for complete search history.

(56) References Cited

U.S. PATENT DOCUMENTS

| | | | |
|---|---|---|---|
| 8,608,230 B2 * | 12/2013 | Young ...................... | B60K 1/04 296/187.02 |
| 8,696,051 B2 | 4/2014 | Charbonneau et al. | |
| 8,702,161 B2 | 4/2014 | Charbonneau et al. | |
| 2016/0311301 A1 * | 10/2016 | Ikeda ................... | B62D 29/001 |

FOREIGN PATENT DOCUMENTS

| | | |
|---|---|---|
| JP | 2013-256265 A | 12/2013 |
| JP | 2015-227124 A | 12/2015 |
| JP | 2016-052834 A | 4/2016 |

* cited by examiner

*Primary Examiner* — Joseph D. Pape
(74) *Attorney, Agent, or Firm* — Oliff PLC

(57) ABSTRACT

The present disclosure provides a vehicle body lower portion structure including: a lower portion framework member, formed in a chamber shape extending in a vehicle body front-and-rear direction, including a guide portion at an inner face of a wall portion structuring the chamber shape, and being disposed at a vehicle body lower side; a battery, installed on a battery frame, and is disposed at a vehicle width direction inner side of the lower portion framework member; and a reinforcing member formed in a chamber shape extending in the vehicle body front-and-rear direction, provided inside a chamber of the lower portion framework member in a state of being supported at the guide portion, and at least a portion of the reinforcing member overlapping with at least one of the battery or the battery frame in a side view seen in a vehicle width direction.

9 Claims, 11 Drawing Sheets

VEHICLE BODY LOWER PORTION STRUCTURE

CROSS-REFERENCE TO RELATED APPLICATION

This application claims priority under 35 USC 119 from Japanese Patent Application No. 2016-233125, filed on Nov. 30, 2016 the disclosure of which is incorporated by reference herein.

BACKGROUND

Technical Field

The present disclosure relates to a vehicle body lower portion structure.

Related Art

A structure in which a reinforcing member formed in a chamber shape is disposed inside a chamber of a lower portion framework member such as a rocker or the like, has been known (for example, see U.S. Pat. No. 8,702,161). This reinforcing member includes plural intersecting ribs that intersect diagonally at a vertical direction central portion of the chamber interior.

However, in a side view seen in a vehicle width direction, the reinforcing member may not overlap with a battery disposed at the vehicle width direction inner side of the rocker. Thus, it may be difficult to suppress deformation of a passenger compartment in a case in which there is a side collision of the vehicle. In other words, this structure has scope for improvement in regard to improving collision safety performance in a case in which there is a side collision of the vehicle.

SUMMARY

The present disclosure provides a vehicle lower body portion structure that may suppress deformation of a passenger compartment and that may improve collision safety performance when there is a side collision of the vehicle.

A first aspect of the present disclosure is a vehicle body lower portion structure including: a lower portion framework member formed in a chamber shape extending in a vehicle body front-and-rear direction, the lower portion framework member including a guide portion at an inner face of a wall portion structuring the chamber shape, the lower portion framework member being disposed at a vehicle body lower side; a battery installed on a battery frame, the battery being disposed at a vehicle width direction inner side of the lower portion framework member; and a reinforcing member formed in a chamber shape extending in the vehicle body front-and-rear direction, the reinforcing member being provided inside a chamber of the lower portion framework member in a state of being supported at the guide portion, and at least a portion of the reinforcing member overlapping with at least one of the battery or the battery frame in a side view seen in a vehicle width direction.

According to the first aspect, in the side view seen in the vehicle width direction, at least a portion of the reinforcing member overlaps with the battery or the battery frame. Therefore, more of a collision load applied during a side collision of the vehicle is transmitted through the reinforcing member to the battery or battery frame, than in a structure in which a reinforcing member does not overlap with a battery or battery frame in a side view seen in the vehicle width direction. As a result, deformation of the passenger compartment may be suppressed and collision safety performance when there is a side collision of the vehicle may be improved.

In a second aspect, in the first aspect, the battery frame may include a cross member disposed to partition the battery into a front and a rear, the cross member extending in the vehicle width direction, and at least a portion of the reinforcing member may overlap with the cross member in a side view seen in the vehicle width direction.

According to the second aspect, in the side view seen in the vehicle width direction, at least a portion of the reinforcing member overlaps with the cross member of the battery frame. Therefore, more of a collision load applied during a side collision of the vehicle is transmitted through the reinforcing member to the cross member of the battery frame than in a structure in which a reinforcing member does not overlap with a cross member of a battery frame in a side view seen in the vehicle width direction. As a result, deformation of the passenger compartment may be further suppressed and collision safety performance when there is a side collision of the vehicle may be improved.

In a third aspect, in the first aspect or the second aspect, in a front view seen in the vehicle body front-and-rear direction, the reinforcing member may be formed in a rectangular shape whose longer direction is in the vehicle width direction, and the reinforcing member may include a plurality of partition walls that plurally partition an interior of a chamber of the reinforcing member.

According to the third aspect, in the front view seen in the vehicle body front-and-rear direction, the chamber interior of the reinforcing member that is formed in the rectangular shape whose longer direction is in the vehicle width direction is plurally partitioned by the plural partition walls. Therefore, deformation such that the reinforcing member splits open is suppressed compared to a reinforcing member in which partition walls are not provided inside a chamber thereof. As a result, a buckling stress of the reinforcing member with respect to a collision load applied during a side collision of the vehicle may be raised.

In a fourth aspect, in the third aspect, a plurality of cavity portions may be partitioned by the partition walls, and, in a front view seen in the vehicle body front-and-rear direction, at least a cavity portion that is furthest to the vehicle width direction inner side may be smaller than one of the other cavity portions.

According to the fourth aspect, in the front view seen in the vehicle body front-and-rear direction, of the plural cavity portions partitioned by the partition walls, at least the cavity portion that is furthest to the vehicle width direction inner side is smaller than the one of the other cavity portions. Therefore, the reinforcing member includes a region at the vehicle width direction outer side with lower rigidity than a region at the vehicle width direction inner side. Thus, a mode of deformation of the reinforcing member toward the vehicle width direction inner side that is caused by a collision load applied during a side collision of the vehicle may be made stable.

In a fifth aspect, in the third aspect or the fourth aspect, the reinforcing member may include a plurality of projection portions at an outer face of a wall portion structuring the chamber shape of the reinforcing member, and the plurality of projection portions may touch the guide portion.

According to the fifth aspect, the plural protrusion portions formed at the outer face of the wall portion structuring the chamber shape of the reinforcing member touch against the guide portion formed at the inner face of the wall portion structuring the chamber shape of the lower portion framework member. Thus, the reinforcing member can be introduced by being inserted into the chamber of the lower portion framework member while the protrusion portions touch against the guide portion. Therefore, frictional forces at the time of insertion are reduced in comparison with a structure in which a reinforcing member is introduced by being inserted into a chamber of a lower portion framework member while an outer face of a wall portion touches against a guide portion. As a result, productivity of the lower portion framework member may be improved.

In a sixth aspect, in the fifth aspect, in a front view seen in the vehicle body front-and-rear direction, the plurality of projection portions may be formed at same positions in the vehicle width direction as walls at both vehicle width direction sides of the reinforcing member and vehicle body vertical direction end portions of the partition walls.

According to the sixth aspect, in the front view seen in the vehicle body front-and-rear direction, the plural protrusion portions are formed at the same positions in the vehicle width direction as the walls at both vehicle width direction sides of the reinforcing member and the vehicle body vertical direction end portions of the partition walls. Therefore, when the reinforcing member is deformed so as to split open, a reaction force from the guide portion is provided more effectively via the protrusion portions than in a structure in which plural protrusion portions are formed at different positions in the vehicle width direction from walls at both vehicle width direction sides of a reinforcing member and vehicle body vertical direction end portions of partition walls. As a result, a buckling stress of the reinforcing member with respect to a collision load applied during a side collision of the vehicle may be raised.

In a seventh aspect, in the first to sixth aspects, the lower portion framework member and the guide portion may be formed integrally.

According to the seventh aspect, because the lower portion framework member and the guide portion are formed integrally, productivity of the lower portion framework member may be further improved compared to a case in which the lower portion framework member and the guide portion are structured as separate bodies.

In an eighth aspect, in the first to seventh aspects, the lower portion framework member may include an upper side chamber portion and a lower side chamber portion, and at least a portion of the guide portion may be structured by a dividing wall that divides the upper side chamber portion from the lower side chamber portion.

According to the eighth aspect, at least a portion of the guide portion is constituted by the dividing wall that divides the upper side chamber portion from the lower side chamber portion of the lower portion framework member. Therefore, productivity of the lower portion framework member may be improved compared to a case in which the guide portion is not constituted by this dividing wall. In addition, rigidity of the lower portion framework member may be improved by this dividing wall.

In a ninth aspect, in the eighth aspect, the lower portion framework member may include a middle chamber portion between the upper side chamber portion and the lower side chamber portion, the middle chamber portion including the dividing wall, and the reinforcing member may be provided inside a chamber of the middle chamber portion.

According to the ninth aspect, the middle chamber portion including the partition wall is formed between the upper side chamber portion and the lower side chamber portion of the lower portion framework member, and the reinforcing member is provided inside the chamber of the middle chamber portion. Consequently, a buckling stress of the lower portion framework member with respect to a collision load applied during a side collision of the vehicle may be raised and deformation of the passenger compartment may be suppressed.

In a tenth aspect, in the eighth aspect or the ninth aspect, a maximum width of the upper side chamber portion in the vehicle width direction may be shorter than a length of the reinforcing member in the vehicle width direction.

According to the tenth aspect, the maximum width of the upper side chamber portion in the vehicle width direction is shorter than the length of the reinforcing member in the vehicle width direction. Therefore, a passenger compartment space may become wider in the vehicle width direction and there may be greater freedom of design of a passenger compartment layout.

In an eleventh aspect, in the first to tenth aspects, the lower portion framework member may include: a rocker extending in the vehicle body front-and-rear direction, and an energy absorbing member formed in a chamber shape extending in the vehicle body front-and-rear direction, the energy absorbing member being disposed at a vehicle body lower side of the rocker.

According to the eleventh aspect, the lower portion framework member is constituted by the rocker and the energy absorbing member disposed at the vehicle body lower side of the rocker. That is, the reinforcing member is provided at the rocker, the energy absorbing member or the like. Therefore, a buckling stress of the lower portion framework member with respect to a collision load applied during a side collision of the vehicle may be raised further and deformation of the passenger compartment may be suppressed.

According to the first aspect, deformation of the passenger compartment may be suppressed and collision safety performance during a side collision of the vehicle may be improved.

According to the second aspect, deformation of the passenger compartment may be further suppressed and collision safety performance during a side collision of the vehicle may be improved.

According to the third aspect, the buckling stress of the reinforcing member with respect to a collision load applied during a side collision of the vehicle may be raised.

According to the fourth aspect, the mode of deformation of the reinforcing member to the vehicle width direction inner side that is caused by a collision load applied during a side collision of the vehicle may be made stable.

According to the fifth aspect, productivity of the lower portion framework member may be improved.

According to the sixth aspect, the buckling stress of the reinforcing member with respect to a collision load applied during a side collision of the vehicle may be raised further.

According to the seventh aspect, productivity of the lower portion framework member may be improved further.

According to the eighth aspect, productivity of the lower portion framework member may be improved, in addition to which rigidity of the lower portion framework member may be improved.

According to the ninth aspect, the buckling stress of the lower portion framework member with respect to a collision load applied during a side collision of the vehicle may be raised and deformation of the passenger compartment may be suppressed.

According to the tenth aspect, the passenger compartment space may be made wider in the vehicle width direction and freedom of design of a passenger compartment layout may be increased.

According to the eleventh aspect, the buckling stress of the lower portion framework member with respect to a collision load applied during a side collision of the vehicle may be raised further and deformation of the passenger compartment may be suppressed.

BRIEF DESCRIPTION OF THE DRAWINGS

Exemplary embodiments will be described in detail based on the following figures, wherein.

DETAILED DESCRIPTION

Figure 1:
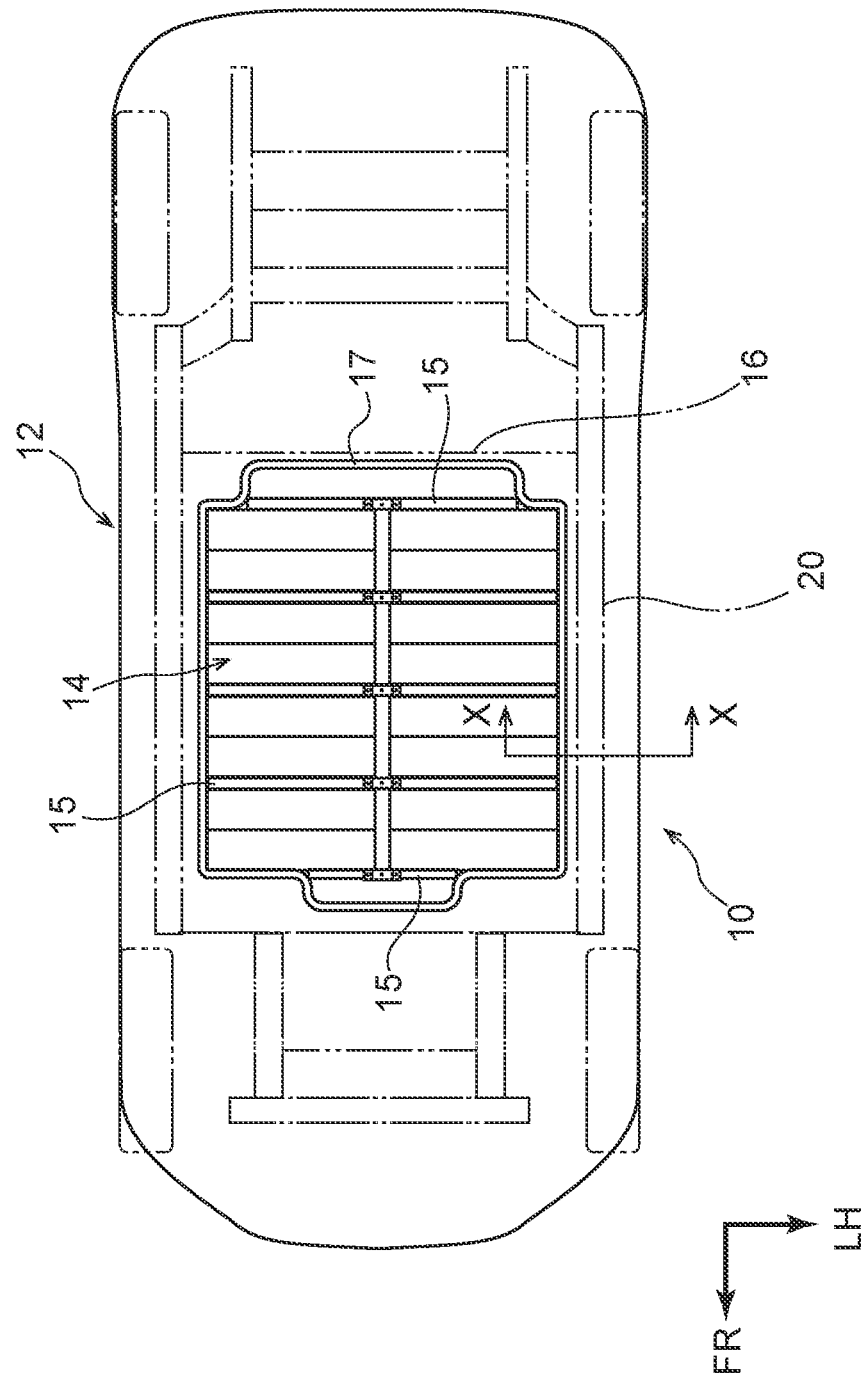
FIG. 1 is a plan diagram of a vehicle equipped with a vehicle body lower portion structure according to a present exemplary embodiment.

Herebelow, an exemplary embodiment relating to the present disclosure is described in detail in accordance with the drawings. For convenience of description, the arrow UP that is shown where appropriate in the drawings indicates a vehicle body upper direction, the arrow FR indicates a vehicle body front direction, and the arrow LH indicates a vehicle body left direction. In the following descriptions, where the directions up and down, front and rear, and left and right are recited without being particularly specified, the same represent up and down in the vehicle body vertical direction, front and rear in the vehicle body front-and-rear direction, and left and right in the vehicle body left-and-right direction (the vehicle width direction).

First Exemplary Embodiment

First, a vehicle body lower portion structure 10 according to a first exemplary embodiment is described. As shown in FIG. 1, in a vehicle 12 that is equipped with the vehicle body lower portion structure 10 according to the present exemplary embodiment, in order to increase a cruising range, a battery 14 is installed at (the vehicle body lower side of) the whole lower face of a floor of a passenger compartment. The battery 14 is constituted by a plural number of storage batteries (for example, an array of eight in the vehicle body front-and-rear direction by two in the vehicle width direction). The exterior of the battery 14 is formed as a rectangular box-shaped case that is relatively stiff (resistant to plastic deformation if a collision load is applied).

Figure 2:
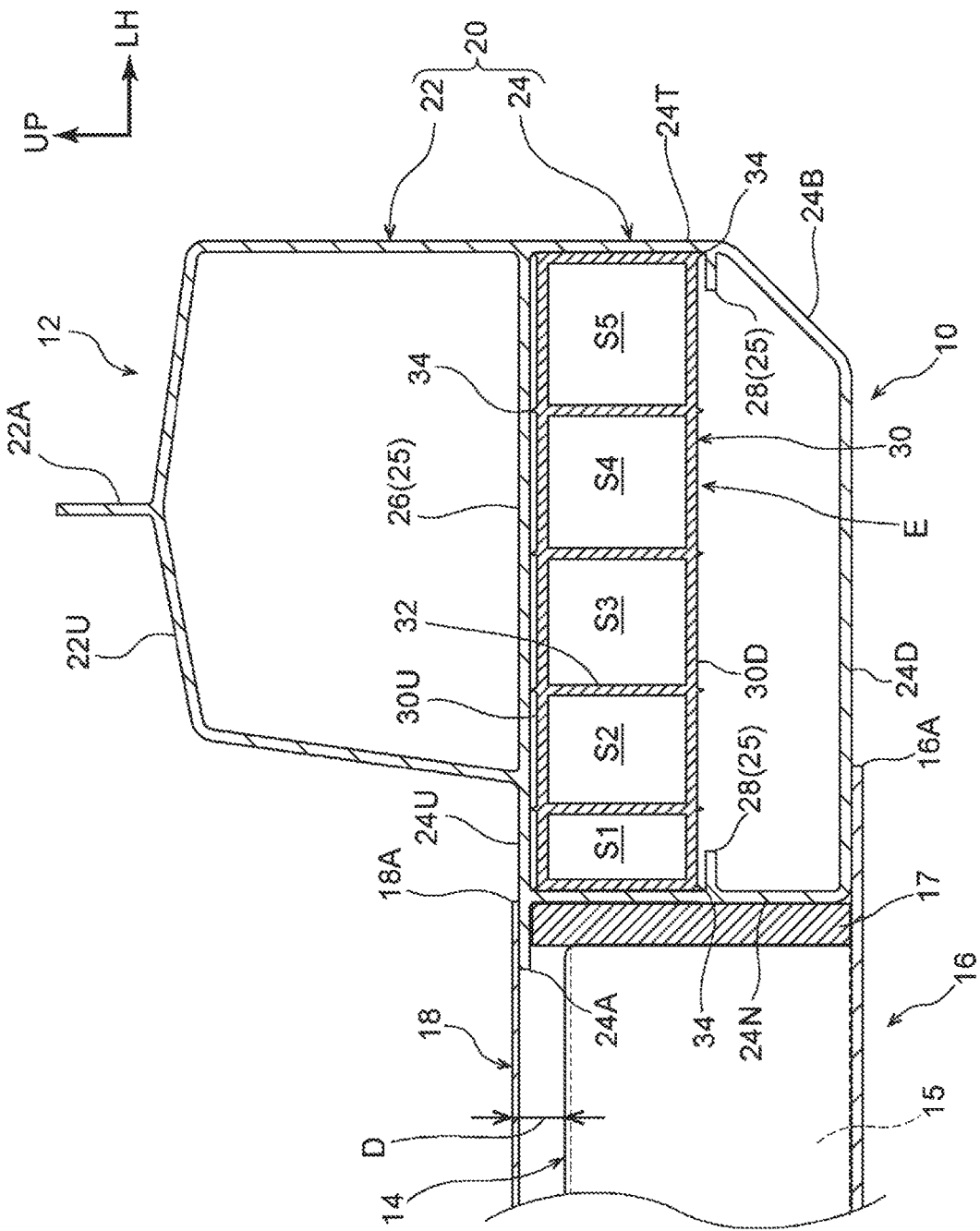
FIG. 2 is a sectional view cut along line X-X in FIG. 1, showing the vehicle body lower portion structure according to the first exemplary embodiment.

As shown in FIG. 1 and FIG. 2, the battery 14 is installed at an upper face of a battery frame 16 that is formed in a tray shape. Periphery walls 17 are provided standing at outer periphery portions of the battery frame 16. Plural cross walls 15 are provided standing at the upper face of the battery frame 16. The cross walls 15 extend in the vehicle width direction to serve as cross members. The cross walls 15 are spaced apart in the vehicle front-and-rear direction and stand to a slightly lower height than the periphery walls 17. The storage batteries constituting the battery 14 are arranged in groups of four in partitions formed by the cross walls 15 (see FIG. 1).

A left and right pair of rockers 20 that serve as lower portion framework members are disposed at the vehicle width direction outer sides of the battery 14 installed on the battery frame 16. In other words, the battery 14 installed on the battery frame 16 is disposed at the vehicle width direction inner sides of the pair of left and right rockers 20 serving as lower portion framework members. As shown in FIG. 2, flange portions 16A protrude to the vehicle width direction outer sides from lower faces of the periphery walls 17 of the battery frame 16. An upper face of each flange portion 16A is joined to a lower face of a lower wall 24D of a lower side chamber portion 24 of the corresponding rocker 20. The lower side chamber portion 24 is described below.

Each rocker 20 is formed in a substantially rectangular chamber shape that extends in the vehicle body front-and-rear direction, by extrusion molding of a lightweight metal material (for example, an aluminium alloy). The rocker 20 is divided into an upper side chamber portion 22 and the lower side chamber portion 24 by a flat plate-shaped dividing wall 26, which functions as a guide portion 25 when a reinforcing member 30 is being inserted. The reinforcing member 30 is described below.

In a front view seen from the vehicle body front side (in the vehicle body front-and-rear direction), which is illustrated in FIG. 2, a vehicle width direction outer side end portion of the lower side chamber portion 24 is coplanar with a vehicle width direction outer side end portion of the upper side chamber portion 22. On the other hand, a vehicle width direction inner side end portion of the lower side chamber portion 24 protrudes further to the vehicle width direction inner side than a vehicle width direction inner side end portion of the upper side chamber portion 22.

In other words, in the state in which the vehicle width direction outer side end portion of the upper side chamber portion 22 is coplanar with the vehicle width direction outer side end portion of the lower side chamber portion 24, a maximum width of the upper side chamber portion 22 in the vehicle width direction is shorter than a maximum width of the lower side chamber portion 24 in the vehicle width direction (and a length in the vehicle width direction of the reinforcing member 30 that is described below).

A flange portion 24A that protrudes to the vehicle width direction inner side is integrally formed at an upper wall 24U at the vehicle width direction inner side end portion of the lower side chamber portion 24. The upper wall 24U protrudes further to the vehicle width direction inner side than the vehicle width direction inner side end portion of the upper side chamber portion 22. A floor panel 18 structures the floor of the passenger compartment. A vehicle width direction outer side end portion 18A of the floor panel 18 is joined to an upper face of the flange portion 24A or to an upper face of the upper wall 24U including the flange portion 24A.

The upper wall 24U at the vehicle width direction inner side end portion of the lower side chamber portion 24 is disposed at the same height as the dividing wall 26. That is, the upper wall 24U and the flange portion 24A are disposed on a line projected to the vehicle width direction inner side from the dividing wall 26. The battery 14 is disposed at the vehicle body lower side relative to the floor panel 18 with a gap D therebetween (see FIG. 2).

In the front view seen in the vehicle body front-and-rear direction, a flat plate-shaped flange portion 22A is integrally formed at a vehicle width direction substantially central portion of an upper face (outer face) of an upper wall 22U of the upper side chamber portion 22. The flange portion 22A extends in the vehicle body front-and-rear direction and a perpendicular direction thereof is in the vehicle width direction. An angled portion 24B is formed at a lower end portion at the vehicle width direction outer side of the lower side chamber portion 24. The angled portion 24B is angled upward toward the vehicle width direction outer side (downward toward the vehicle width direction inner side). The angled portion 24B integrally links an outer side wall 24T and the lower wall 24D, which are described below.

The outer side wall 24T and an inner side wall 24N serve as portions of wall portions structuring a chamber shape of the lower side chamber portion 24. Rib-shaped guide walls 28 that serve as the guide portion 25 are integrally formed at an inner face of the outer side wall 24T and an inner face of the inner side wall 24N. Each guide wall 28 protrudes into the chamber along the vehicle width direction. That is, the guide portion 25 according to the present exemplary embodiment is constituted by the dividing wall 26 and the guide walls 28.

Projection portions 34 are formed at both of vehicle width direction end portions of a lower face (outer face) of a lower wall 30D of the reinforcing member 30, which is described below. Projection lengths of the guide walls 28 in the vehicle width direction are not particularly limited but may be, for example, at least lengths of an extent capable of supporting the projection portions 34 from the vehicle body lower side.

In order to improve rigidity of the rocker 20, the reinforcing member 30 is introduced into a region of the interior of the chamber of the lower side chamber portion 24 that is encircled by the dividing wall 26, the outer side wall 24T, a portion of the inner side wall 24N and the guide walls 28 (below referred to as "the insertion region E"). The reinforcing member 30 is introduced by being inserted into the insertion region E from the vehicle body front side or the vehicle body rear side (in the vehicle body front-and-rear direction).

Figure 3:
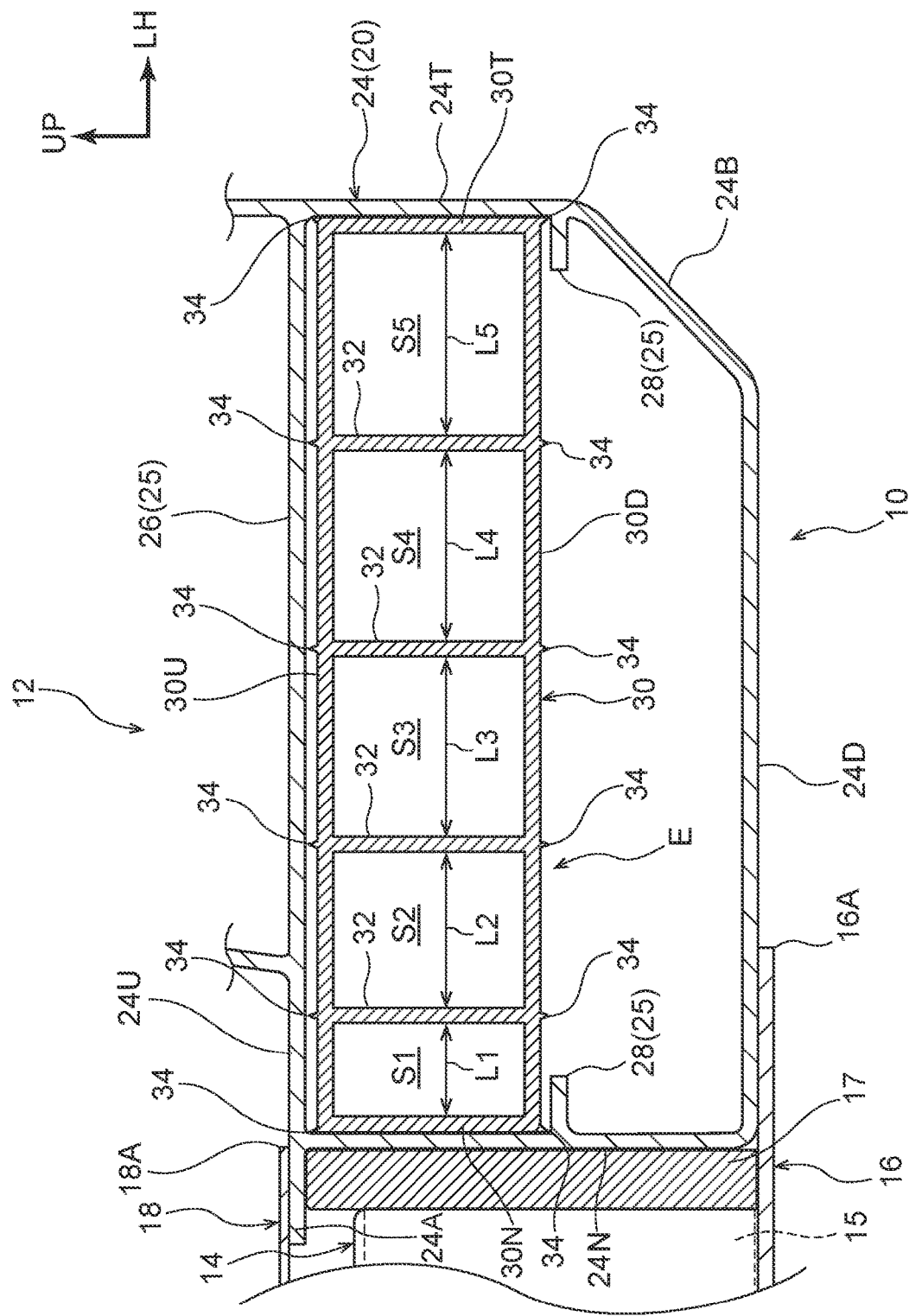
FIG. 3 is a magnified sectional diagram of a portion of FIG. 2, showing the vehicle body lower portion structure according to the first exemplary embodiment.

As illustrated in FIG. 3, the reinforcing member 30 is formed in a rectangular chamber shape extending in the vehicle body front-and-rear direction, by extrusion molding of a lightweight metal material (for example, an aluminium alloy). In a front view seen in the vehicle front-and-rear direction, the longer direction of the rectangular chamber shape is in the vehicle width direction. A plural number (for example, four) of partition walls 32 are integrally formed inside the chamber of the reinforcing member 30. The partition walls 32 partition the interior of the chamber into plural partitions.

Each partition wall 32 is formed in a flat plate shape that extends in the vehicle body front-and-rear direction with the perpendicular direction thereof in the vehicle width direction. The partition walls 32 are disposed so as to divide the interior of the chamber of the reinforcing member 30 in the vehicle width direction. Describing this in more detail, in the front view seen in the vehicle body front-and-rear direction, a plural number (for example, five) of cavity portions S1 to S5 of the reinforcing member 30 that are partitioned by the partition walls 32 are formed such that clearances L1 to L5 in the vehicle width direction become progressively longer from the vehicle width direction inner side toward the vehicle width direction outer side (such that the clearances become progressively smaller from the vehicle width direction outer side toward the vehicle width direction inner side).

That is, positions of the partition walls 32 are appropriately specified such that the clearances L1 to L5 in the vehicle width direction of the plural number (five in this example) of cavity portions S1 to S5 in the reinforcing member 30 partitioned by the partition walls 32 progressively increase from the vehicle width direction inner side toward the vehicle width direction outer side (progressively decrease from the vehicle width direction outer side toward the vehicle width direction inner side).

The clearances L1 to L5 may be understood as lengths in the vehicle width direction along an upper wall 30U and the lower wall 30D that are partitioned up (segmented) by the partition walls 32. The upper wall 30U and lower wall 30D are wall portions in flat plate shapes structuring the chamber shape of the reinforcing member 30. The plural projection portions 34 are integrally formed at an upper face (outer face) of the upper wall 30U and the lower face (outer face) of the lower wall 30D. Each of the plural projection portions 34 extends in the vehicle body front-and-rear direction.

Describing this in more detail, in the front view seen in the vehicle body front-and-rear direction, the projection portions 34 are formed so as to form substantial isosceles triangle shapes or substantial equilateral triangle shapes at the upper face of the upper wall 30U and the lower face of the lower wall 30D. The projection portions 34 are formed such that only peak portions thereof touch against a lower face of the dividing wall 26 and upper faces of the guide walls 28. Thus, the reinforcing member 30 is introduced by being inserted into the insertion region E formed in the chamber of the lower side chamber portion 24 of the rocker 20 while only the peak portions of the plural projection portions 34 touch against the lower face of the dividing wall 26 and the upper faces of the guide walls 28.

In particular, the projection portions 34 formed at both the vehicle width direction end portions of the lower face of the lower wall 30D of the reinforcing member 30 are disposed to be supported from the vehicle body lower side by the upper faces of the guide walls 28. An outer side wall 30T and an inner side wall 30N serve as flat plate-shaped wall portions structuring the chamber shape of the reinforcing member 30. The projection portions 34 are disposed at the same positions in the vehicle width direction as respective vehicle width direction end portions of the upper face of the upper wall 30U and the lower face of the lower wall 30D of the reinforcing member 30, which is to say, as respective vehicle body vertical direction end portions of the outer side wall 30T and the inner side wall 30N. The projection portions 34 are also disposed at the same positions in the vehicle width direction as respective vehicle body vertical direction end portions of the partition walls 32.

Now, operations of the vehicle body lower portion structure 10 according to the first exemplary embodiment structured as described above are described.

As described above, in a side view seen in the vehicle width direction, at least a portion of the reinforcing member 30 overlaps with the battery 14 or the battery frame 16 (the periphery walls 17 and the cross walls 15). Therefore, a collision load applied during a side collision of the vehicle 12 is transmitted to the battery 14 or the battery frame 16 via the reinforcing member 30 more efficiently than in a structure in which the reinforcing member 30 does not overlap with the battery 14 or the battery frame 16 in the side view seen in the vehicle width direction. Consequently, deformation of the passenger compartment may be suppressed and collision safety performance during a side collision of the vehicle 12 may be improved.

As described above, the exterior of the battery 14 according to the present exemplary embodiment is structured by a relatively stiff case and is a structure that is resistant to plastic deformation if a collision load is applied thereto. Therefore, even if a collision load is transmitted to the battery 14, the insides of the battery 14 may be protected.

That is, according to the present exemplary embodiment, because a collision load applied during a side collision of the vehicle 12 may be transmitted to the battery 14, a load transmission member for transmitting the collision load may be reduced in weight or may be omitted. Therefore, a higher load endurance performance may be provided without an increase in weight of the vehicle 12.

In the front view seen in the vehicle body front-and-rear direction, the interior of the chamber of the reinforcing member 30 is plurally partitioned by the plural partition walls 32. Therefore, rigidity, which is to say a buckling stress of the reinforcing member 30 with respect to a collision load applied during a side collision of the vehicle 12 may be made higher than in a reinforcing member in which the partition walls 32 are not provided inside the chamber of the reinforcing member 30 (a structure in which the lengths in the vehicle width direction of the upper wall 30U and lower wall 30D are not divided into short segments by the vehicle body vertical direction end portions of the partition walls 32, which structure is not shown in the drawings).

In particular, in the front view seen in the vehicle body front-and-rear direction, the plural number (in this example, five) of cavity portions S1 to S5 partitioned by the partition walls 32 of the reinforcing member 30 are formed such that the clearances L1 to L5 in the vehicle width direction progressively become longer from the vehicle width direction inner side toward the vehicle width direction outer side (progressively become smaller from the vehicle width direction outer side toward the vehicle width direction inner side).

Therefore, rigidity of the reinforcing member 30 rises (progressively) from the vehicle width direction outer side region toward the vehicle width direction inner side region.

Consequently, as illustrated in FIG. 4A to FIG. 6B, a mode of deformation of the reinforcing member 30 toward the vehicle width direction inner side that is caused by a collision load applied during a side collision of the vehicle 12 may be made stable, and deformation of the passenger compartment may be suppressed.

Figure 4A:
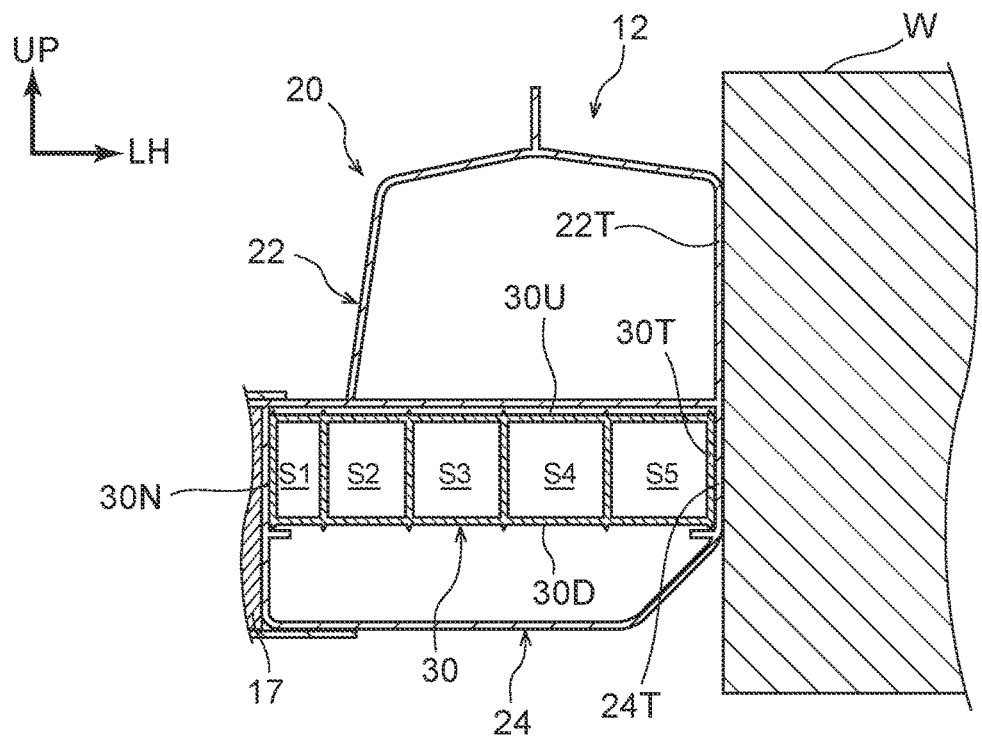
FIG. 4A is a descriptive diagram showing a state just before a side collision of the vehicle equipped with the vehicle body lower portion structure according to the first exemplary embodiment.
Figure 4B:
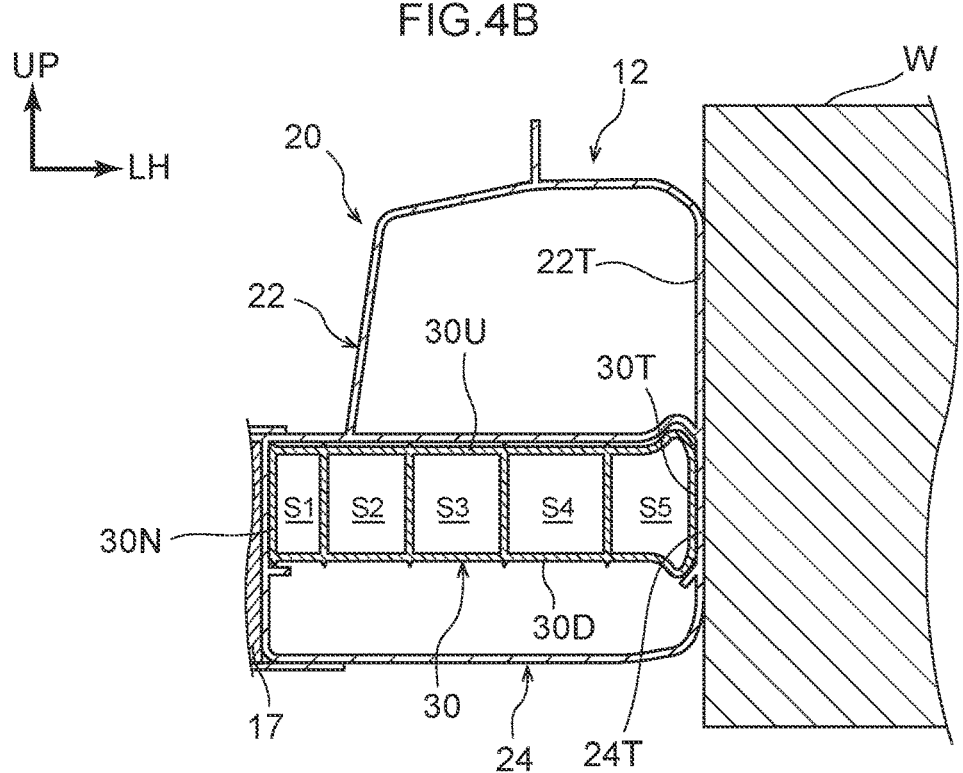
FIG. 4B is a descriptive diagram showing a state just after the side collision of the vehicle equipped with the vehicle body lower portion structure according to the first exemplary embodiment.

To describe this in specific terms, when the vehicle 12 undergoes a side collision against a barrier W as illustrated in FIG. 4A, a collision load from the barrier W is applied to an outer side wall 22T of the upper side chamber portion 22 and the outer side wall 24T of the lower side chamber portion 24 of the rocker 20. Accordingly, as illustrated in FIG. 4B, the rocker 20 is plastically deformed toward the vehicle width direction inner side. In addition, portions of the reinforcing member 30 that structure the cavity portion S5, which is to say vehicle width direction outer side end portions of the upper wall 30U and lower wall 30D are plastically deformed so as to split open upward and downward (i.e., the upper wall 30U is plastically deformed toward the vehicle body upper side and the lower wall 30D is plastically deformed toward the vehicle body lower side).

Figure 5A:
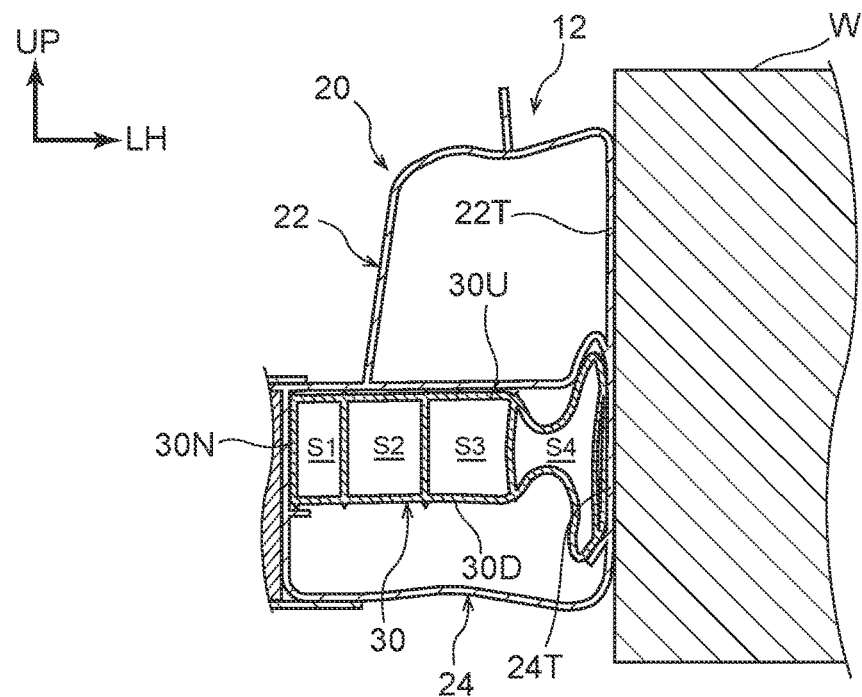
FIG. 5A is a descriptive diagram showing a state subsequent to FIG. 4B when the side collision of the vehicle equipped with the vehicle body lower portion structure according to the first exemplary embodiment has occurred.
Figure 5B:
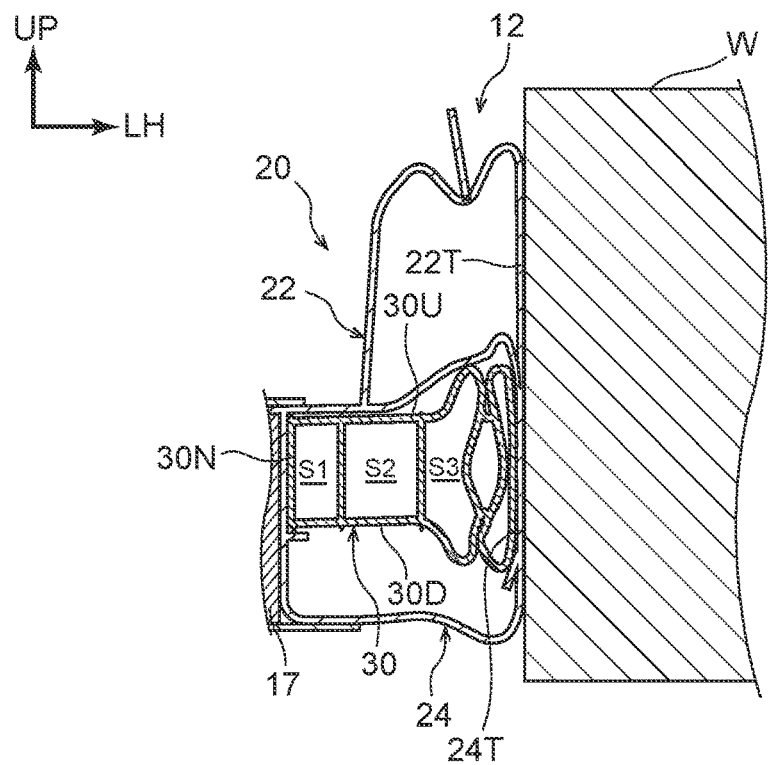
FIG. 5B is a descriptive diagram showing a state subsequent to FIG. 5A when the side collision of the vehicle equipped with the vehicle body lower portion structure according to the first exemplary embodiment has occurred.

In association with further plastic deformation of the rocker 20 toward the vehicle width direction inner side, as illustrated in FIG. 5A, a portion of the upper wall 30U and a portion of the lower wall 30D at portions of the reinforcing member 30 that structure the cavity portion S4 are plastically deformed so as to move towards one another. Then, as illustrated in FIG. 5B, a portion of the upper wall 30U and a portion of the lower wall 30D at portions of the reinforcing member 30 that structure the cavity portion S3 are plastically deformed so as to split open upward and downward (away from one another).

Figure 6A:
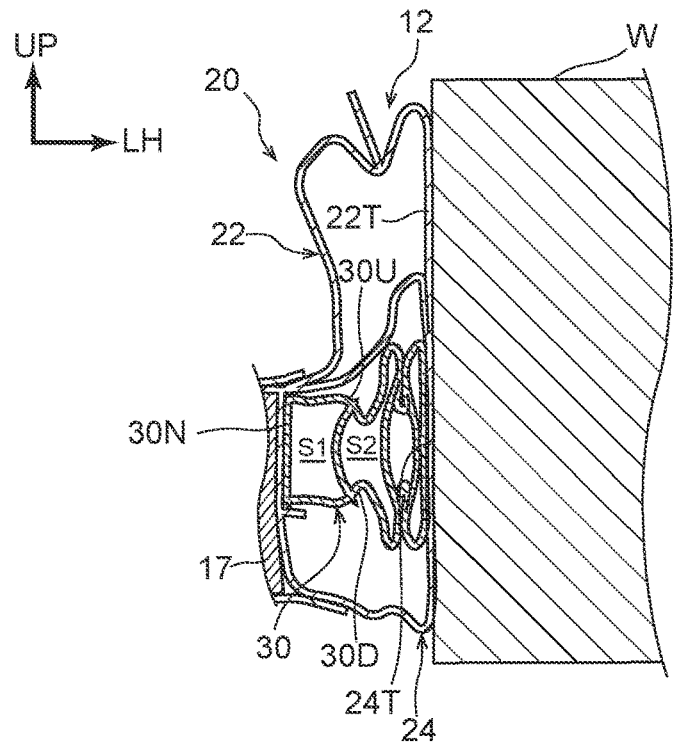
FIG. 6A is a descriptive diagram showing a state subsequent to FIG. 5B when the side collision of the vehicle equipped with the vehicle body lower portion structure according to the first exemplary embodiment has occurred.
Figure 6B:
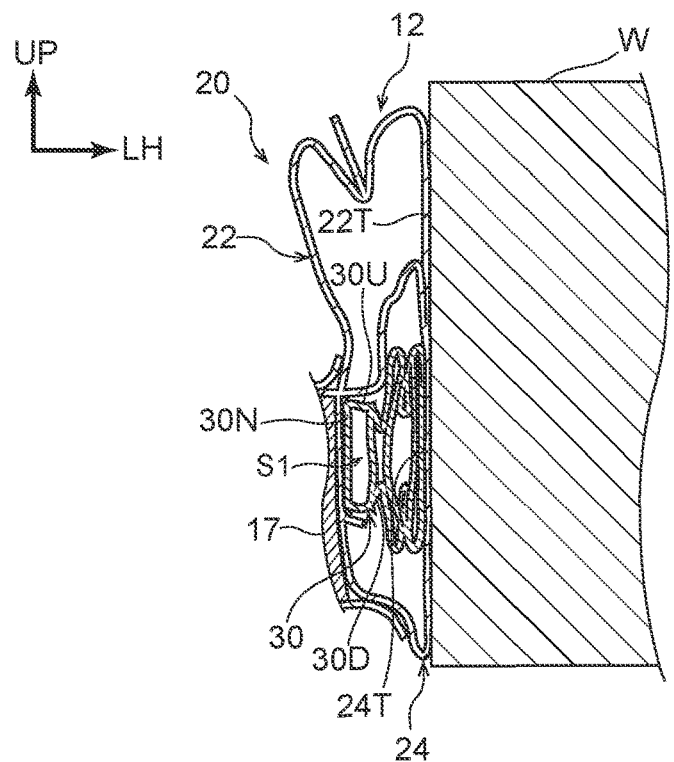
FIG. 6B is a descriptive diagram showing a state subsequent to FIG. 6A when the side collision of the vehicle equipped with the vehicle body lower portion structure according to the first exemplary embodiment has occurred.

Then, as illustrated in FIG. 6A, a portion of the upper wall 30U and a portion of the lower wall 30D at portions of the reinforcing member 30 that structure the cavity portion S2 are plastically deformed so as to move towards one another. Thus, energy of the collision load applied to the outer side walls 22T and 24T of the rocker 20 is effectively absorbed and, as illustrated in FIG. 6B, plastic deformation of a portion of the upper wall 30U and a portion of the lower wall 30D at portions of the reinforcing member 30 that structure the cavity portion S1 (the region with the highest rigidity) is suppressed.

That is, because the reinforcing member 30 is structured so as to be plastically deformed sequentially from the lower rigidity side to the higher rigidity side, the collision load (collision energy) applied to the outer side walls 22T and 24T of the rocker 20 is efficiently energy-absorbed by a stable deformation mode toward the vehicle width direction inner side of the reinforcing member 30 (plastic deformation from lower rigidity to higher rigidity). Therefore, during a side collision of the vehicle 12, deformation such that the passenger compartment space is reduced in width may be suppressed.

In the reinforcing member 30 shown in the drawings, the positions of the partition walls 32 are appropriately specified such that the clearances L1 to L5 in the vehicle width direction of the cavity portions S1 to S5 progressively become longer from the vehicle width direction inner side toward the vehicle width direction outer side (progressively become smaller from the vehicle width direction outer side toward the vehicle width direction inner side). However, the present disclosure is not limited thereto.

In the present exemplary embodiment, a structure is acceptable if at least the clearance L1 in the vehicle width direction of the cavity portion S1 at the vehicle width direction inner side is shorter than one of the clearances L2 to L5 in the vehicle width direction of the other cavity portions S2 to S5. Therefore, although not shown in the drawings, a structure is also possible in which, for example, only the clearance L1 in the vehicle width direction of the cavity portion S1 at the vehicle width direction inner side is shorter than the clearances L2 to L5 in the vehicle width direction of the remaining cavity portions S2 to S5, and the clearances L2 to L5 in the vehicle width direction of the remaining cavity portions S2 to S5 are equal.

The reinforcing member 30 is introduced by being inserted into the insertion region E with the peak portions of the plural projection portions 34 that are formed integrally at the upper face of the upper wall 30U and the lower face of the lower wall 30D touching against the lower face of the dividing wall 26 and the upper faces of the guide walls 28. Therefore, frictional resistance of the reinforcing member 30 against the lower face of the dividing wall 26 and the upper faces of the guide walls 28 may be reduced compared to a case of insertion into the insertion region E with the upper face of the upper wall 30U and the lower face of the lower wall 30D of the reinforcing member 30 touching against the lower face of the dividing wall 26 and the upper faces of the guide walls 28.

That is, according to the present exemplary embodiment, frictional forces when the reinforcing member 30 is inserted into the rocker 20 may be reduced. Thus, productivity of the rocker 20 may be improved. In addition, because the dividing wall 26 and the guide walls 28 are formed integrally with the rocker 20, productivity of the rocker 20 may be improved compared to a case in which the rocker 20 is structured as a separate body from the dividing wall 26 and the guide walls 28.

Furthermore, because at least a portion of the guide portion 25 is constituted by the dividing wall 26 that divides the upper side chamber portion 22 from the lower side chamber portion 24 of the rocker 20, productivity of the rocker 20 may be further improved compared to a case in which the guide portion 25 is not constituted by the dividing wall 26. There is also an advantage in that rigidity of the rocker 20 with respect to a load applied from the vehicle width direction outer side may be improved by the dividing wall 26.

In the front view seen in the vehicle body front-and-rear direction, the plural projection portions 34 are formed at the same positions in the vehicle width direction as the vehicle body vertical direction end portions of the outer side wall 30T and inner side wall 30N of the reinforcing member 30 and the vehicle body vertical direction end portions of the partition walls 32. Therefore, when the reinforcing member 30 is deformed so as to split open, reaction forces from the dividing wall 26 and guide walls 28 are provided via the projection portions 34 more effectively than in a structure in which the plural projection portions 34 are formed at different positions in the vehicle width direction from the vehicle body vertical direction end portions of the outer side wall 30T and inner side wall 30N of the reinforcing member 30 and the vehicle body vertical direction positions of the partition walls 32. Thus, the buckling stress of the reinforcing member 30 with respect to a collision load applied during a side collision of the vehicle 12 may be raised.

In the state in which the vehicle width direction outer side end portion of the upper side chamber portion 22 and the vehicle width direction outer side end portion of the lower side chamber portion 24 are coplanar, the maximum width of the upper side chamber portion 22 in the vehicle width direction is shorter than the maximum width of the lower side chamber portion 24 in the vehicle width direction (and the length of the reinforcing member 30 in the vehicle width direction).

Therefore, compared to a structure in which the maximum width of the upper side chamber portion 22 in the vehicle width direction is the same as the maximum width of the lower side chamber portion 24 in the vehicle width direction (or the length of the reinforcing member 30 in the vehicle width direction), the length of the floor panel 18 in the vehicle width direction may be made longer, and the passenger compartment space may be widened by a corresponding amount. As a result, there may be greater freedom of design of a passenger compartment layout.

Second Exemplary Embodiment

Now, the vehicle body lower portion structure 10 according to a second exemplary embodiment is described. Portions that are the same as in the first exemplary embodiment are assigned the same reference symbols and detailed descriptions thereof (including operations that are the same) are omitted as appropriate.

Figure 7:
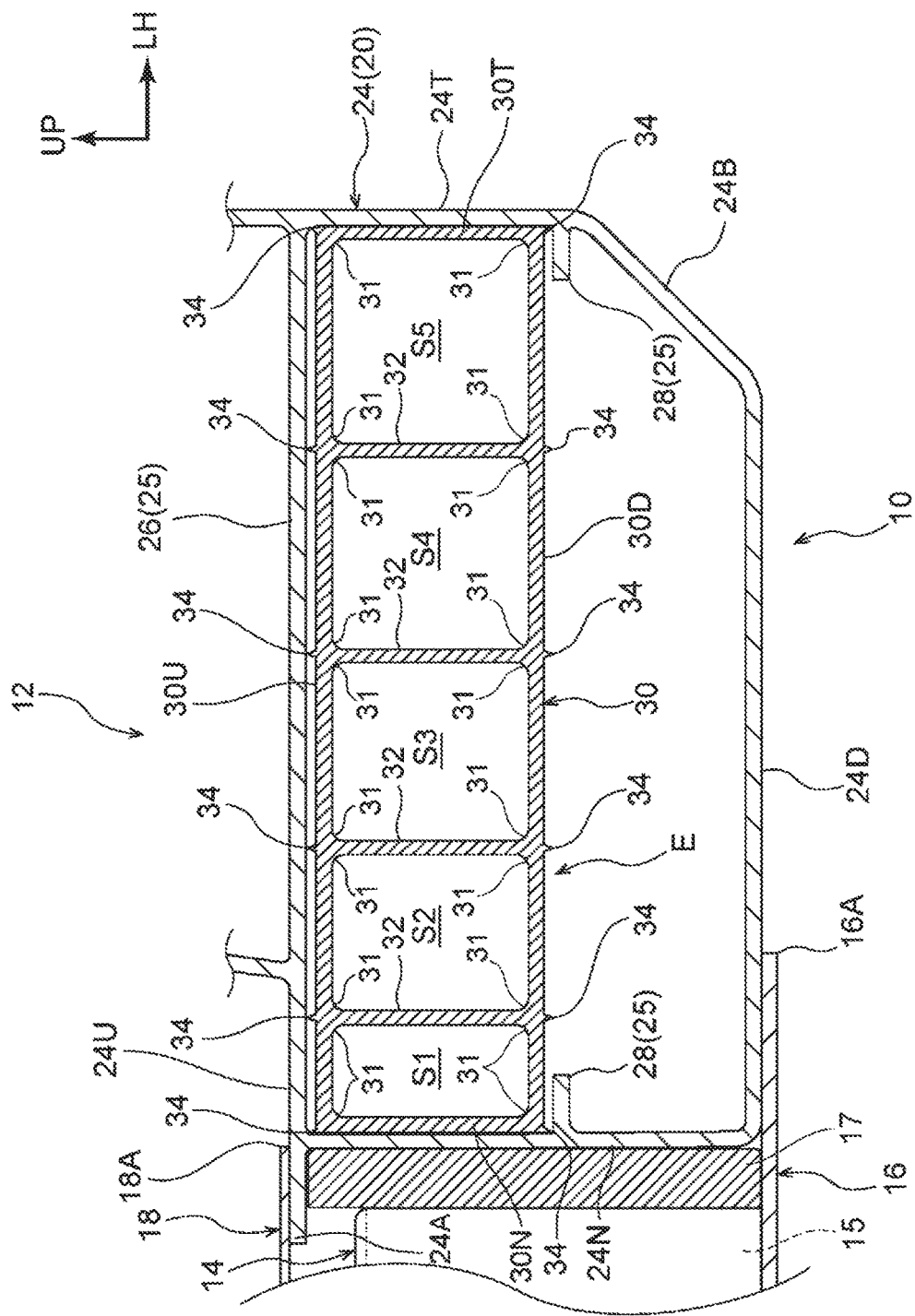
FIG. 7 is a sectional diagram corresponding to FIG. 3, showing a vehicle body lower portion structure according to a second exemplary embodiment.

As shown in FIG. 7, in the vehicle body lower portion structure 10 according to the second exemplary embodiment, corner portions 31 are formed at both vehicle body vertical direction end portions of each partition wall 32 of the reinforcing member 30, at respective intersections of the lower face of the upper wall 30U and upper face of the lower wall 30D with faces of the partition walls 32 facing to the vehicle width direction inner side and faces of the partition walls 32 facing to the vehicle width direction outer side. The corner portions 31 are formed in circular arc shapes in a front view seen in the vehicle body front-and-rear direction. Thus, plate thicknesses of the upper wall 30U and lower wall 30D including the corner portions 31 are increased. That is, rigidities of the upper wall 30U and lower wall 30D including the corner portions 31 are improved.

Therefore, in addition to the operations of the vehicle body lower portion structure 10 according to the first exemplary embodiment described above, when the reinforcing member 30 is deformed so as to split open during a side collision of the vehicle 12, reaction forces from the dividing wall 26 and the guide walls 28 are even more effectively provided via the projection portions 34. As a result, the buckling stress of the reinforcing member 30 with respect to the collision load applied during the side collision of the vehicle 12 may be raised even further. The corner portions 31 are similarly formed at the vehicle body vertical direction end portions of the outer side wall 30T and inner side wall 30N, at respective intersections of the lower face of the upper wall 30U and upper face of the lower wall 30D with a face facing to the vehicle width direction inner side and a face facing to the vehicle width direction outer side of the outer side wall 30T and inner side wall 30N.

Third Exemplary Embodiment

Now, the vehicle body lower portion structure 10 according to a third exemplary embodiment is described. Portions that are the same as in the above-described first exemplary embodiment and second exemplary embodiment are assigned the same reference numerals and detailed descriptions thereof (including operations that are the same) are omitted as appropriate.

Figure 8:
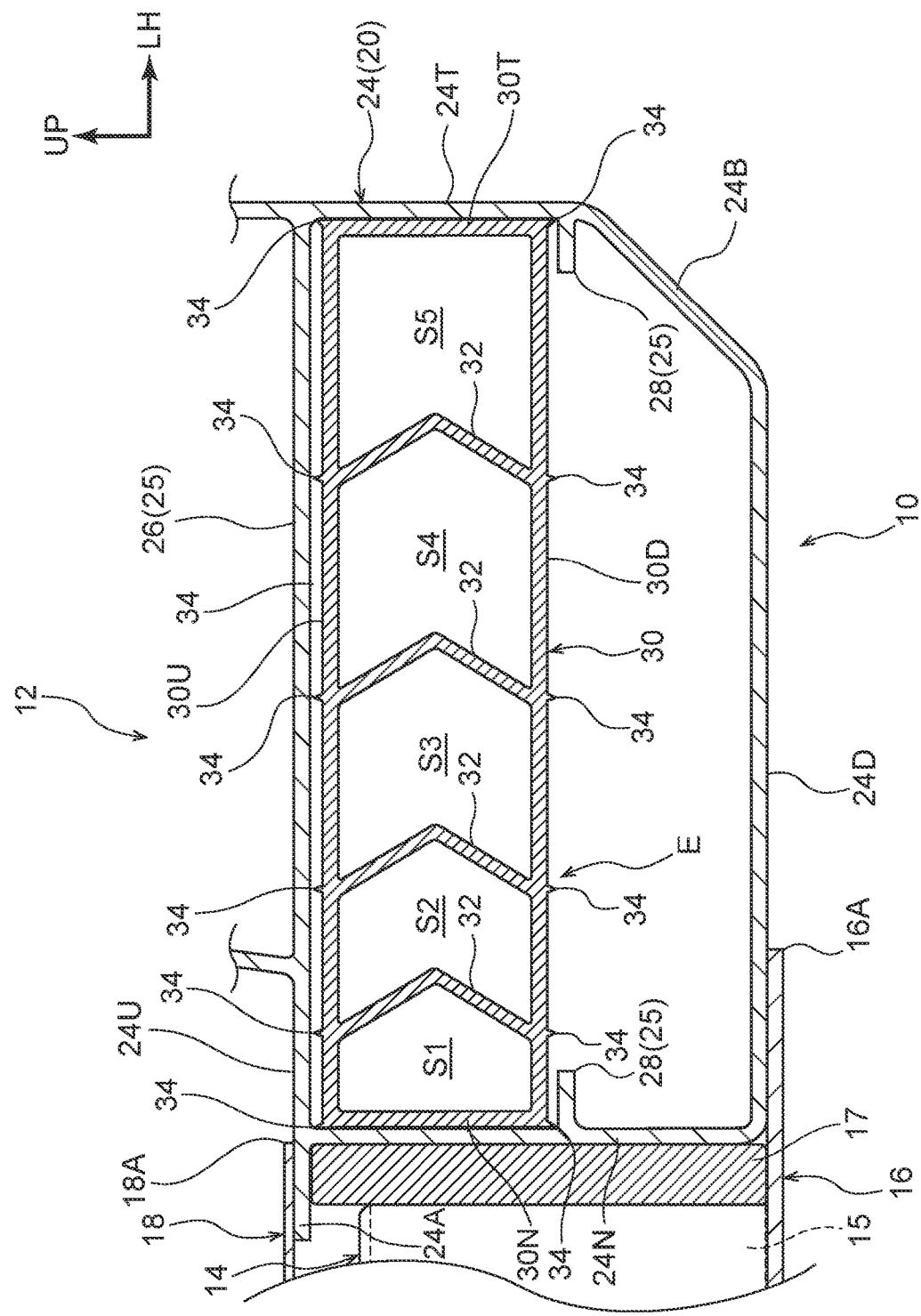
FIG. 8 is a sectional diagram corresponding to FIG. 3, showing a vehicle body lower portion structure according to a third exemplary embodiment.

As shown in FIG. 8, in the vehicle body lower portion structure 10 according to the third exemplary embodiment, in a front view seen in the vehicle body front-and-rear direction, each partition wall 32 of the reinforcing member 30 is formed in a pointed shape of which a vehicle body vertical direction central portion protrudes in an obtuse triangular shape toward the vehicle width direction outer side. Thus, rigidity of each partition wall 32 with respect to a load applied from the vehicle width direction outer side may be improved.

Therefore, in addition to the operations of the vehicle body lower portion structure 10 according to the first exemplary embodiment described above, when the reinforcing member 30 is deformed so as to split open during a side collision of the vehicle 12, reaction forces from the dividing wall 26 and the guide walls 28 are even more effectively provided via the projection portions 34. As a result, the buckling stress of the reinforcing member 30 with respect to the collision load applied during the side collision of the vehicle 12 may be raised even further.

Fourth Exemplary Embodiment

Now, the vehicle body lower portion structure 10 according to a fourth exemplary embodiment is described. Portions that are the same as in the above-described first to third exemplary embodiments are assigned the same reference numerals and detailed descriptions thereof (including operations that are the same) are omitted as appropriate.

Figure 9:
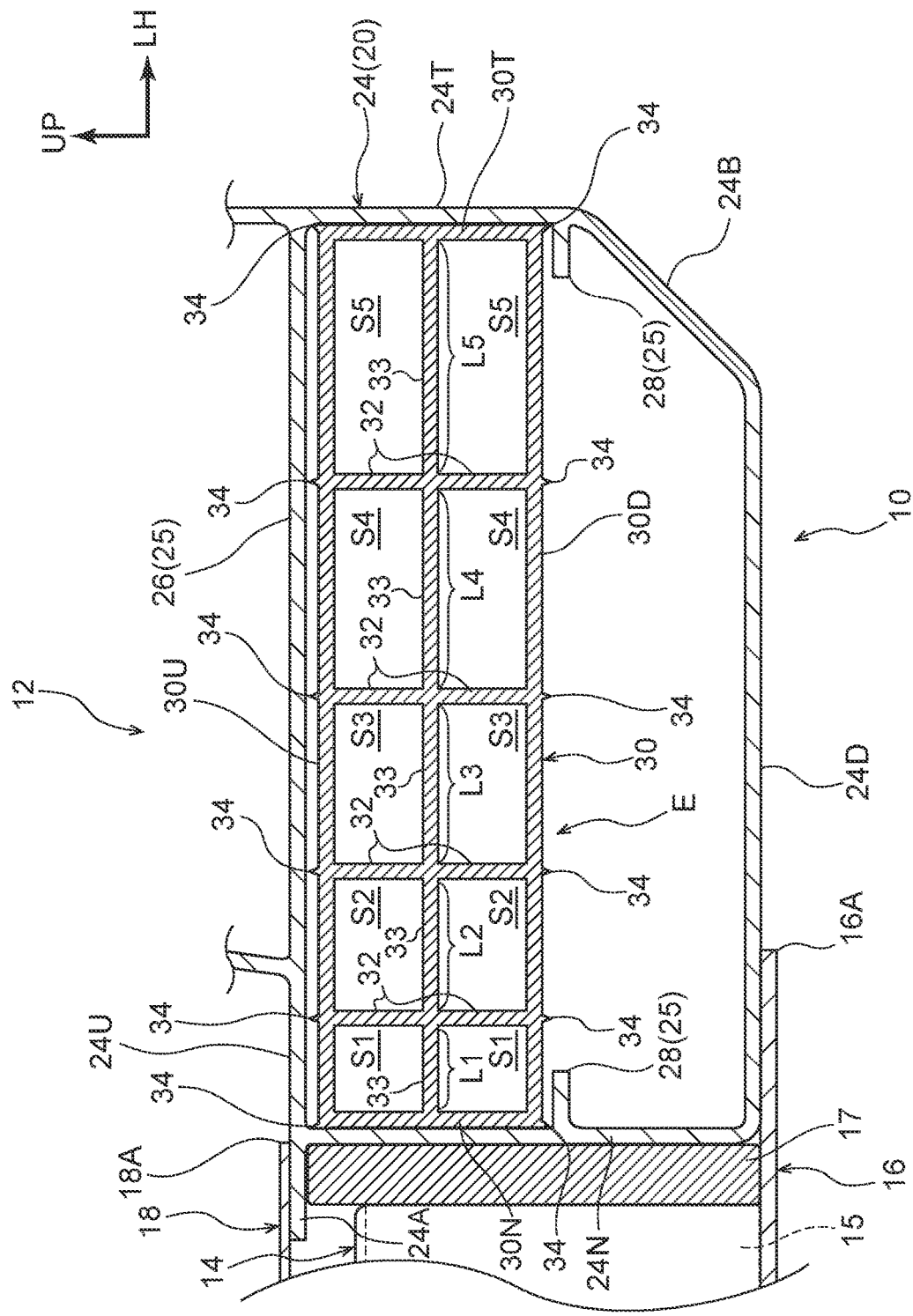
FIG. 9 is a sectional diagram corresponding to FIG. 3, showing a vehicle body lower portion structure according to a fourth exemplary embodiment.

As shown in FIG. 9, in the vehicle body lower portion structure 10 according to the fourth exemplary embodiment, further partition walls 33 are added at substantially central portions in the vehicle body vertical direction of the partition walls 32 of the reinforcing member 30. The partition walls 33 extend in the vehicle body front-and-rear direction with perpendicular directions thereof in the vehicle body vertical direction. That is, the reinforcing member 30 features the partition walls 32 and 33 in a grid pattern. Upper and lower cavity portions partitioned by the partition walls 33 serve as the cavity portions S1 to S5. Lengths in the vehicle width direction of the upper and lower cavity portions are equal to the respective clearances L1 to L5.

Therefore, in addition to the operations of the vehicle body lower portion structure 10 according to the first exemplary embodiment described above, during a side collision of the vehicle 12, energy of a collision load applied from the vehicle width direction outer side may be absorbed more effectively, particularly by plastic deformation of the partition walls 33. Thus, according to the fourth exemplary embodiment, the buckling stress of the reinforcing member 30 with respect to a collision load applied during a side collision of the vehicle 12 may be raised even further.

The partition walls 32 and 33 of the reinforcing member 30 in the grid pattern are not limited to the illustrated pattern. For example, although not shown in the drawings, further partition walls that extend in the vehicle body front-and-rear direction with the perpendicular directions thereof in the vehicle body vertical direction may be added, being spaced from the partition walls 33 by predetermined clearances in the vehicle body vertical direction, and further partition walls that extend in the vehicle body front-and-rear direction with the perpendicular directions thereof in the vehicle width direction may be added, being spaced from the partition walls 32 by predetermined clearances in the vehicle width direction.

Fifth Exemplary Embodiment

Now, the vehicle body lower portion structure 10 according to a fifth exemplary embodiment is described. Portions that are the same as in the above-described first to fourth exemplary embodiments are assigned the same reference numerals and detailed descriptions thereof (including operations that are the same) are omitted as appropriate.

Figure 10:
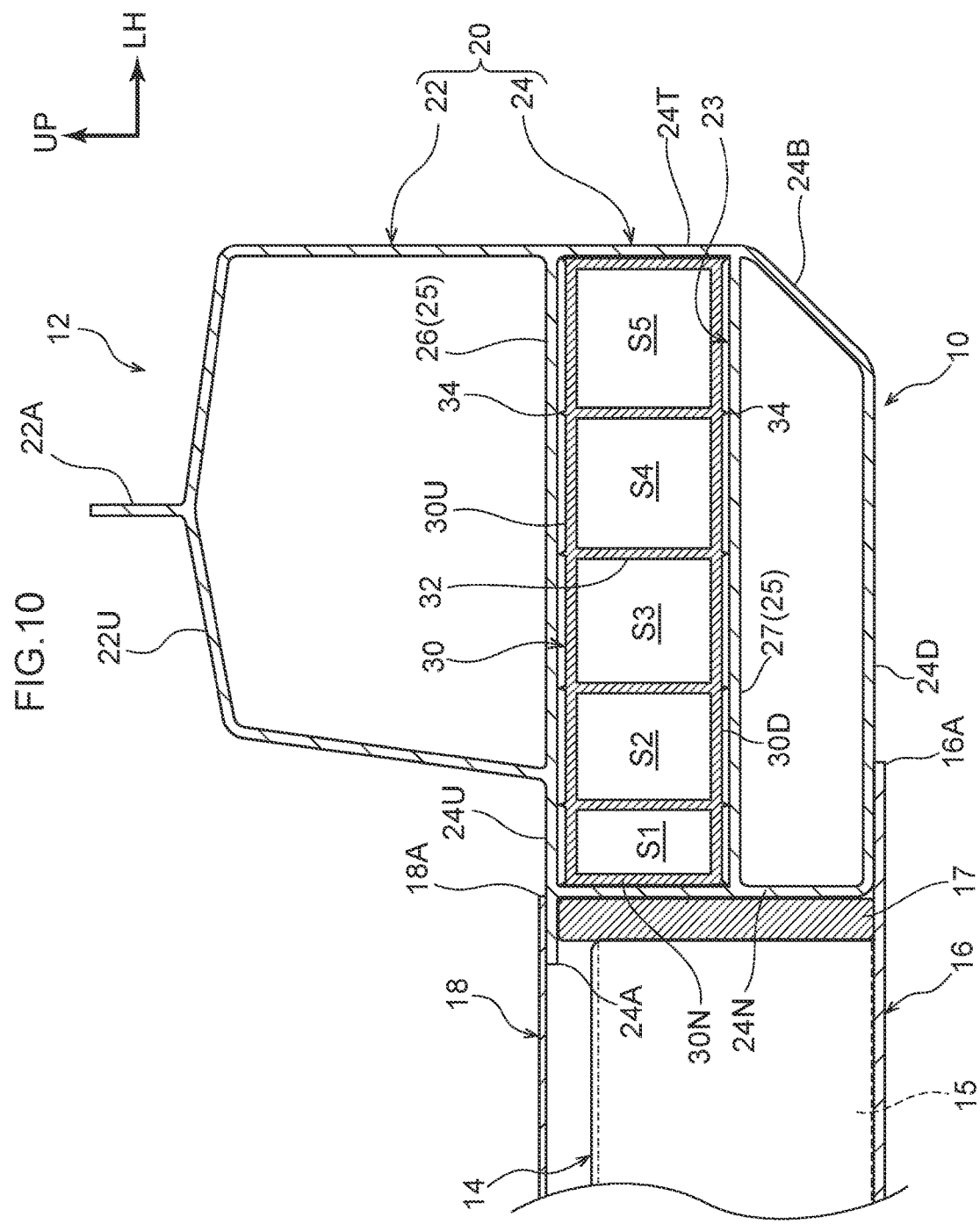
FIG. 10 is a sectional diagram corresponding to FIG. 2, showing a vehicle body lower portion structure according to a fifth exemplary embodiment.

As shown in FIG. 10, in the vehicle body lower portion structure 10 according to the fifth exemplary embodiment, separately from the dividing wall 26 that is integrally provided between the upper side chamber portion 22 and the lower side chamber portion 24 of the rocker 20, a lower dividing wall 27 is integrally provided in the rocker 20. The lower dividing wall 27 divides the lower side chamber portion 24 into upper and lower portions and serves as the guide portion 25. That is, a middle chamber portion 23 with interior dimensions substantially the same as the exterior dimensions of the reinforcing member 30 is formed in the lower side chamber portion 24 of the rocker 20 by the dividing wall 26, the outer side wall 24T, a portion of the inner side wall 24N, and the lower dividing wall 27.

The reinforcing member 30 is introduced by being inserted into the chamber of this middle chamber portion 23 from the vehicle body front side or the vehicle body rear side. That is, the reinforcing member 30 is introduced by being inserted into the middle chamber portion 23 while only the peak portions of the plural projection portions 34 that are integrally formed at the upper face of the upper wall 30U and the lower face of the lower wall 30D touch against the lower face of the dividing wall 26 and the upper face of the lower dividing wall 27.

Therefore, frictional resistance of the reinforcing member 30 against the lower face of the dividing wall 26 and the upper face of the lower dividing wall 27 may be reduced compared to a case of insertion of the reinforcing member 30 into the middle chamber portion 23 with the upper face of the upper wall 30U and the lower face of the lower wall 30D of the reinforcing member 30 touching against the lower face of the dividing wall 26 and the upper face of the lower dividing wall 27.

That is, according to the fifth exemplary embodiment, even in the configuration in which the reinforcing member 30 is introduced by being inserted into the middle chamber portion 23, frictional forces during the insertion of the reinforcing member 30 into the middle chamber portion 23 may be reduced. As a result, productivity of the rocker 20 may be improved. Further, according to the fifth exemplary embodiment, the buckling stress of the rocker 20 with respect to a collision load applied during a side collision of the vehicle 12 may be raised by the lower dividing wall 27. Therefore, deformation of the passenger compartment may be further suppressed.

Sixth Exemplary Embodiment

Now, the vehicle body lower portion structure 10 according to a sixth exemplary embodiment is described. Portions that are the same as in the above-described first to fifth exemplary embodiments are assigned the same reference numerals and detailed descriptions thereof (including operations that are the same) are omitted as appropriate.

Figure 11:
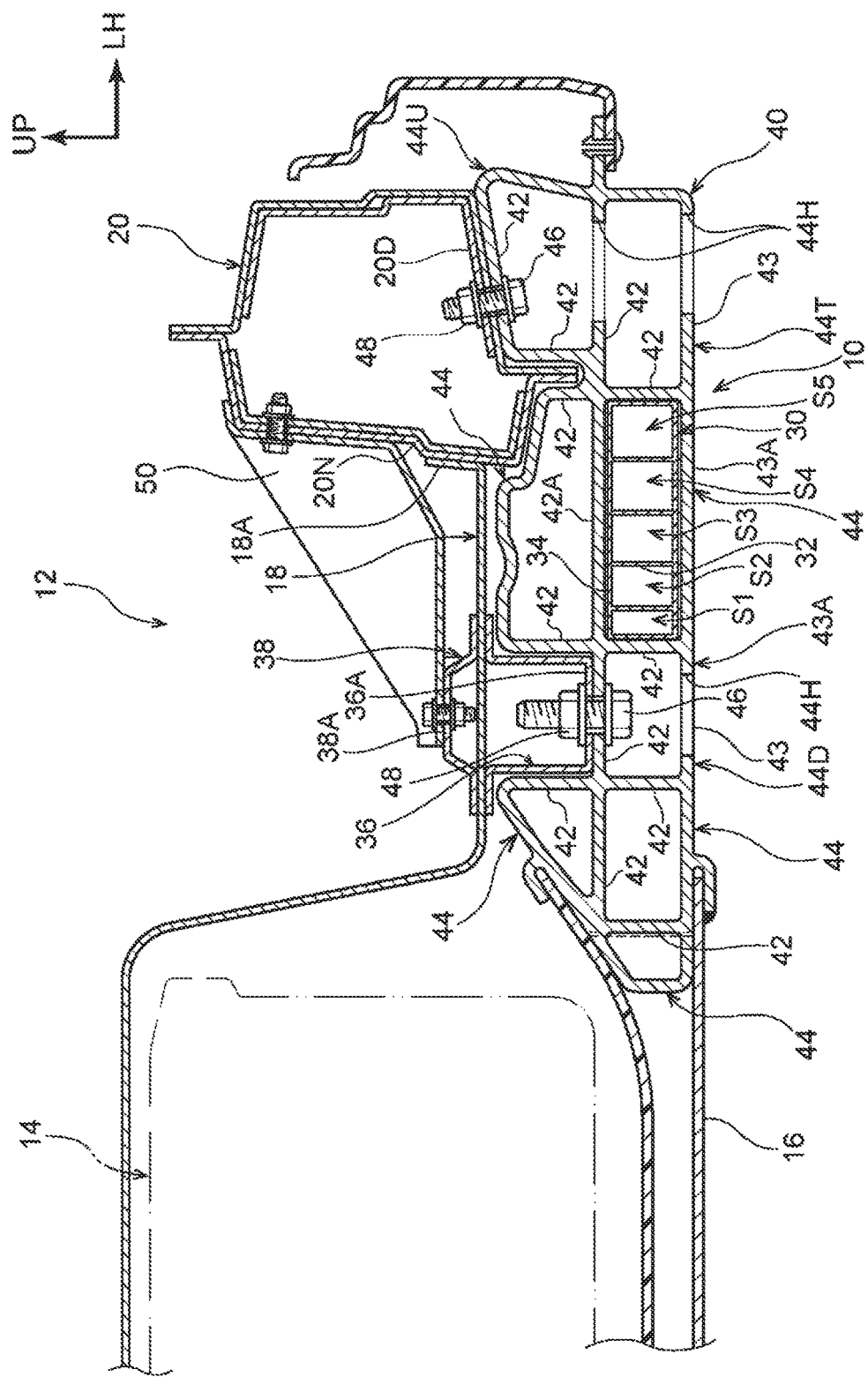
FIG. 11 is a sectional diagram corresponding to FIG. 2, showing a vehicle body lower portion structure according to a sixth exemplary embodiment.

As shown in FIG. 11, in the vehicle body lower portion structure 10 according to the sixth exemplary embodiment, the lower portion framework member is structured by the rocker 20 in the chamber shape that extends in the vehicle body front-and-rear direction and an energy absorbing member 40. The energy absorbing member 40 is formed in a chamber shape that extends in the vehicle body front-and-rear direction, and is disposed at the vehicle body lower side of the rocker 20 and the floor panel 18 (i.e., the floor panel 18 that is provided between the rocker 20 and the battery 14).

The energy absorbing member 40 is formed by extrusion molding of a lightweight metal material (for example, an aluminium alloy). In a front view seen in the vehicle body front-and-rear direction, the energy absorbing member 40 is partitioned by plural dividing walls 42 into a plural number (for example, two in the vehicle body vertical direction by five in the vehicle width direction) of partition portions 44. A partition portion 44U that is an upper portion at the vehicle width direction outer side is fastened to a lower wall 20D of the rocker 20 by a bolt 46 and a weld nut 48. An under member 36 is joined to the lower face of the floor panel 18. A partition portion 44D that is a lower portion at the vehicle width direction inner side is fastened to a lower wall 36A of the under member 36 by others of the bolt 46 and weld nut 48.

Work apertures 44H for inserting and screwing in the bolts 46 are formed in each of the partition walls 42 at the vehicle body lower side of the partition portion 44U and lower walls 43 of the partition portion 44D and a partition portion 44T that is at the vehicle body lower side of the partition portion 44U. The under member 36 is formed in a hat shape in cross section and extends in the vehicle body front-and-rear direction. An upper member 38 is joined to the upper face of the floor panel 18. The upper member 38 is formed in a hat shape in cross section and extends in the vehicle body front-and-rear direction.

Thus, the under member 36 and the upper member 38 are opposingly disposed to sandwich the floor panel 18 from above and below. An upper wall 38A of the upper member 38 is linked by a linking member 50 to an inner side wall 20N that is disposed at the vehicle width direction inner side of the rocker 20. The vehicle width direction outer side end portion 18A of the floor panel 18 is inflected to the vehicle body upper side and is joined to the inner side wall 20N of the rocker 20.

The reinforcing member 30 is introduced by being inserted from the vehicle body front side or the vehicle body rear side into at least one of the plural partition portions 44 of the energy absorbing member 40 (for example, a partition portion 44A that is a lower portion at a vehicle width direction middle portion). A dividing wall 42A and a lower wall 43A structure the partition portion 44A. The reinforcing member 30 is introduced by being inserted into the partition portion 44A while only the peak portions of the plural projection portions 34 that are formed integrally at the upper face of the upper wall 30U and the lower face of the lower wall 30D touch against the lower face of the dividing wall 42A and the upper face of the lower wall 43A.

Therefore, frictional resistance of the reinforcing member 30 against the dividing wall 42A and lower wall 43A may be reduced compared to a case of insertion of the reinforcing member 30 into the partition portion 44A with the upper face of the upper wall 30U and the lower face of the lower wall 30D of the reinforcing member 30 touching against the lower face of the dividing wall 42A and the upper face of the lower wall 43A structuring the partition portion 44A. That is, according to the sixth exemplary embodiment, even in the configuration in which the reinforcing member 30 is introduced by being inserted into the partition portion 44A, frictional forces during the insertion of the reinforcing member 30 into the partition portion 44A may be reduced. As a result, productivity of the energy absorbing member 40 may be improved.

Further, according to the sixth exemplary embodiment, a buckling stress of the lower portion framework member, that is, of the rocker 20 and the energy absorbing member 40 with respect to a collision load applied during a side collision of the vehicle 12 may be raised by each of the linking member 50 and the reinforcing member 30. Therefore, deformation of the passenger compartment during a side collision of the vehicle 12 may be further suppressed.

The partition portion 44 in which the reinforcing member 30 is provided is not limited to the partition portion 44A as shown in FIG. 11. Moreover, it is sufficient if the energy absorbing member 40 itself includes at least one of the partition portions 44 in which the reinforcing member 30 is provided; the energy absorbing member 40 is not limited to the shape shown in FIG. 11. Furthermore, as in the first to fifth exemplary embodiments described above, the reinforcing member 30 may be provided inside a chamber of the rocker 20. That is, in the sixth exemplary embodiment, it is sufficient that the reinforcing member 30 be provided at least in the partition portions 44 of the energy absorbing member 40.

Hereabove, the vehicle body lower portion structure 10 according to the present exemplary embodiments has been described on the basis of the attached drawings. However, the vehicle body lower portion structure 10 according to the present exemplary embodiments is not limited to the illustrated structures; suitable design modifications may be applied within a scope not departing from the gist of the present disclosure. For example, it is sufficient if the number of the partition walls 32 is at least two; the number is not limited to four as shown in the drawings. Furthermore, the partition walls 32 may be disposed diagonally with respect to the vehicle body vertical direction and the vehicle width direction.

The projection portions 34 are formed to be continuous in the vehicle body front-and-rear direction, but this is not limiting; the projection portions 34 may be formed to be intermittent in the vehicle body front-and-rear direction. The guide walls 28 are not limited to a structure that is formed integrally with the rocker 20. For example, structures are possible in which the guide walls 28 are joined to the inner face of the outer side wall 24T and the inner face of the inner side wall 24N of the lower side chamber portion 24 of the rocker 20 by adhesive, rivets or the like.

Lightweight metal materials are not limited to aluminium alloys, and the reinforcing member 30 is not limited to a structure that is formed of a lightweight metal material. For example, the reinforcing member 30 may be formed of a relatively stiff resin material (an "engineering plastic") such as a polycarbonate (PC) or the like. The first to sixth exemplary embodiments may be combined as appropriate. For example, the reinforcing member 30 of the third exemplary embodiment, the fourth exemplary embodiment or the like may be employed in the fifth exemplary embodiment, the sixth exemplary embodiment or the like.

What is claimed is:

1. A vehicle body lower portion structure comprising:
   a lower portion framework member formed in a chamber shape and extending in a vehicle body front-and-rear direction, the lower portion framework member including a guide portion at an inner face of a wall portion structuring the chamber shape, the lower portion framework member being disposed at a vehicle body lower side;
   a battery installed on a battery frame, the battery being disposed at a vehicle width direction inner side of the lower portion framework member; and
   a reinforcing member formed in a chamber shape and extending in the vehicle body front-and-rear direction, the reinforcing member being disposed inside a chamber of the lower portion framework member and supported by the guide portion, and at least a portion of the reinforcing member overlapping with at least one of the battery or the battery frame when viewed from a side view in a vehicle width direction, the reinforcing member including a plurality of partition walls that partition an interior of a chamber of the reinforcing member into a plurality of cavity portions, one cavity portion of the plurality of cavity portions, which is closest to the battery, is smaller than one of the remaining cavity portions of the plurality of cavity portions, wherein:
when viewed from a front view in the vehicle body front-and-rear direction, the reinforcing member is formed in a rectangular shape with a longer side in the vehicle width direction.

2. The vehicle body lower portion structure according to claim 1, wherein:
the battery frame includes a cross member that partitions the battery into a front battery and a rear battery, the cross member extending in the vehicle width direction; and
when viewed from the side view in the vehicle width direction, at least a portion of the reinforcing member overlaps with the cross member.

3. The vehicle body lower portion structure according to claim 1, wherein:
the reinforcing member includes a plurality of projection portions at an outer face of a wall portion, the wall portion structuring the chamber shape of the reinforcing member, and
the plurality of projection portions contact the guide portion.

4. The vehicle body lower portion structure according to claim 3, wherein, when viewed from the front view in the vehicle body front-and-rear direction, the plurality of projection portions are aligned in the vehicle width direction with walls at both vehicle width direction sides of the reinforcing member and at vehicle body vertical direction end portions of the plurality of partition walls.

5. The vehicle body lower portion structure according to claim 1, wherein the lower portion framework member and the guide portion are formed integrally.

6. The vehicle body lower portion structure according to claim 1, wherein:
the lower portion framework member includes an upper side chamber portion and a lower side chamber portion; and
at least a portion of the guide portion includes a dividing wall that divides the upper side chamber portion from the lower side chamber portion.

7. The vehicle body lower portion structure according to claim 6, wherein:
the lower portion framework member includes a middle chamber portion between the upper side chamber portion and the lower side chamber portion, the middle chamber portion including the dividing wall; and
the reinforcing member is provided inside a chamber of the middle chamber portion.

8. The vehicle body lower portion structure according to claim 6, wherein a maximum width of the upper side chamber portion in the vehicle width direction is shorter than a length of the reinforcing member in the vehicle width direction.

9. The vehicle body lower portion structure according to claim 1, wherein the lower portion framework member includes:
a rocker extending in the vehicle body front-and-rear direction; and
an energy absorbing member formed in a chamber shape and extending in the vehicle body front-and-rear direction, the energy absorbing member being disposed at a vehicle body lower side of the rocker.

* * * * *